US008078737B2

(12) United States Patent
Cosmadopoulos et al.

(10) Patent No.: US 8,078,737 B2
(45) Date of Patent: Dec. 13, 2011

(54) SYSTEM AND METHOD FOR EFFICIENT STORAGE OF LONG-LIVED SESSION STATE IN A SIP SERVER

(75) Inventors: Ioannis Cosmadopoulos, San Francisco, CA (US); Vinod Mehra, Fremont, CA (US); Paul James Devine, San Francisco, CA (US); Reto Kramer, Issaquah, WA (US)

(73) Assignee: Oracle International Corporation, Redwood Shores, CA (US)

( * ) Notice: Subject to any disclaimer, the term of this patent is extended or adjusted under 35 U.S.C. 154(b) by 633 days.

(21) Appl. No.: 11/956,110

(22) Filed: Dec. 13, 2007

(65) Prior Publication Data

US 2009/0006598 A1 Jan. 1, 2009

Related U.S. Application Data (60) Provisional application No. 60/869,873, filed on Dec. 13, 2006.

(51) Int. Cl.
  *G06F 7/00* (2006.01)
  *G06F 15/16* (2006.01)
(52) U.S. Cl. .................... 709/228; 709/202; 707/661
(58) Field of Classification Search .................... 709/228
  See application file for complete search history.

(56) References Cited

U.S. PATENT DOCUMENTS

| | | | |
|---|---|---|---|
| 5,440,727 A | 8/1995 | Bhide et al. | |
| 5,941,999 A | 8/1999 | Matena et al. | |
| 5,963,974 A | 10/1999 | Arimilli et al. | |
| 6,012,059 A | 1/2000 | Neimat et al. | |
| 6,052,724 A | 4/2000 | Willie et al. | |
| 6,134,673 A | 10/2000 | Chrabaszcz | |
| 6,226,686 B1 | 5/2001 | Rothschild et al. | |
| 6,304,949 B1 | 10/2001 | Houlsdworth | |
| 6,480,862 B1 | 11/2002 | Gall | |
| 6,557,038 B1 * | 4/2003 | Becker et al. | 709/228 |
| 6,625,705 B2 | 9/2003 | Yanai et al. | |
| 6,625,751 B1 | 9/2003 | Starovic et al. | |
| 6,629,260 B1 | 9/2003 | Dancer et al. | |
| 6,823,477 B1 | 11/2004 | Cheng et al. | |
| 6,877,111 B2 * | 4/2005 | Sharma et al. | 714/13 |

(Continued)

OTHER PUBLICATIONS

BEA Systems, Inc., BEA WebLogic SIP Server: Configuring and Managing WebLogic SIP Server, Dec. 2, 2005, BEA Systems, Inc., Version 2.1, pp. 4-13.

*Primary Examiner* — Patrice Winder
*Assistant Examiner* — Neeraj Utreja
(74) *Attorney, Agent, or Firm* — Fliesler Meyer LLP (57) ABSTRACT

A SIP server can be deployed in a two-tier architecture, including an engine tier for processing of SIP communications and a state tier for maintaining the state associated with these communications. The state tier can include RAM-based replicas that provide data to the engines. Some of the SIP session state can be moved to the database in order to reduce the memory requirements of the state tier. Upon determining that a transaction boundary has been reached where the session state is steady, the state replica can save the data to the database. A hint can be received from the engine tier by the state replica indicating that the state data is ready to be saved. Subsequently, the data can be removed from the state tier by nulling out the bytes of actual data, while preserving the primary key, locking and timer information so as not to impact latency.

17 Claims, 8 Drawing Sheets

U.S. PATENT DOCUMENTS

| | | |
|---|---|---|
| 6,904,140 B2 * | 6/2005 | Trossen .................. 379/207.04 |
| 7,073,090 B2 | 7/2006 | Yanai et al. |
| 7,246,256 B2 | 7/2007 | De La Cruz et al. |
| 7,392,421 B1 | 6/2008 | Bloomstein et al. |
| 7,406,618 B2 | 7/2008 | Fung et al. |
| 7,506,194 B2 | 3/2009 | Appanna et al. |
| 7,606,839 B2 | 10/2009 | Aronoff et al. |
| 2003/0158908 A1 | 8/2003 | Jacobs et al. |
| 2003/0163761 A1 | 8/2003 | Chen et al. |
| 2004/0002881 A1 | 1/2004 | Hu et al. |
| 2004/0168162 A1 | 8/2004 | Park et al. |
| 2004/0260967 A1 | 12/2004 | Guha et al. |
| 2004/0267882 A1 | 12/2004 | Whynot et al. |
| 2005/0022047 A1 | 1/2005 | Chandrasekaran |
| 2005/0038828 A1 * | 2/2005 | Kaluskar et al. ............. 707/200 |
| 2005/0038836 A1 * | 2/2005 | Wang ............................ 707/204 |
| 2005/0203962 A1 | 9/2005 | Zhou et al. |
| 2005/0203994 A1 | 9/2005 | Palmer et al. |
| 2005/0237999 A1 | 10/2005 | Shores et al. |
| 2005/0262499 A1 * | 11/2005 | Read ............................. 717/172 |
| 2006/0010224 A1 | 1/2006 | Sekar et al. |
| 2006/0069776 A1 | 3/2006 | Shim et al. |
| 2006/0153068 A1 * | 7/2006 | Dally et al. ....................... 714/1 |
| 2007/0220302 A1 * | 9/2007 | Cline et al. ....................... 714/4 |
| 2008/0021939 A1 | 1/2008 | Dahlstedt et al. |
| 2008/0126832 A1 | 5/2008 | Morosan et al. |

* cited by examiner

SYSTEM AND METHOD FOR EFFICIENT STORAGE OF LONG-LIVED SESSION STATE IN A SIP SERVER

CLAIM OF PRIORITY

The present application claims the benefit of U.S. Provisional Patent Application No. 60/869,873 entitled SYSTEM AND METHOD FOR EFFICIENT STORAGE OF A LONG-LIVED SESSION STATE IN A SIP SERVER, by Ioannis Cosmadopoulos et al., filed on Dec. 13, 2006, which is incorporated herein by reference in its entirety.

CROSS REFERENCE TO RELATED APPLICATIONS

The following commonly owned, co-pending United States Patents and Patent Applications, including the present application, are related to each other. Each of the other patents/applications are incorporated by reference herein in their entirety:

U.S. Provisional Patent Application No., 60/869,871 entitled SYSTEM AND METHOD FOR PROTECTING AGAINST FAILURE THROUGH GEO-REDUNDANCY IN A SIP SERVER, by Ioannis Cosmadopoulos, et al., filed on Dec. 13, 2006;

U.S. application Ser. No. 11/956,094 entitled SYSTEM AND METHOD FOR PROTECTING AGAINST FAILURE THROUGH GEO-REDUNDANCY IN A SIP SERVER, by Ioannis Cosmadopoulos, et al., filed on Dec. 13, 2007;

U.S. patent application Ser. No. 11/545,648, entitled SIP SERVER ARCHITECTURE FAULT TOLERANCE AND FAILOVER, by Anno R. Langen, et al., filed on Oct. 10, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing communications and more particularly to handling the storage of session state in a telecommunications network environment.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VOIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. Furthermore, latency has been an important issue in addressing the processing of telecommunications, as more and more users expect seemingly instantaneous access from their devices.

The storage of session state associated with various telecommunications has become an important issue in this environment. Many types of telecommunication applications require very fast access to the data, such as random access memory (RAM) based access, while others can tolerate slower disk based speeds. At the same time, RAM is typically significantly more expensive to maintain for an organization that manages thousands, hundreds of thousands, or even millions of telecommunications daily. What is needed is a way to efficiently store the session state data of these telecommunications such that various providers are able to provide low latency services and at the same time saving costs associated with fast memory access storage.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for efficient storage of long lived session state in a session initiation protocol (SIP) server. In various embodiments, a SIP server can be deployed in a two tier architecture, including an engine tier for high throughput processing of various SIP communications and a state tier for maintaining the session state associated with these communications. The state tier can be composed of a set of partitions having random access memory (RAM) based replicas that can respond to queries for data from the engine tier. In some embodiments, at least some of the SIP session state that is long-lived can be moved to the database in order to reduce the expensive memory requirements of the state tier. For example, upon determining that a transaction boundary has been reached where the session state is steady, the state replica can replicate at least some of the data to the database. Determining that a transaction boundary has been reached can include receiving a hint from the engine tier by the state replica that the state data is ready to be saved to the database. Subsequently, the state data can be removed from the state tier. Removing the state data can include nulling out the byte representation of the actual data, while preserving the primary key, locking and timer information associated with the session state so as not to impact latency requirements of the SIP server.

Figure 1:
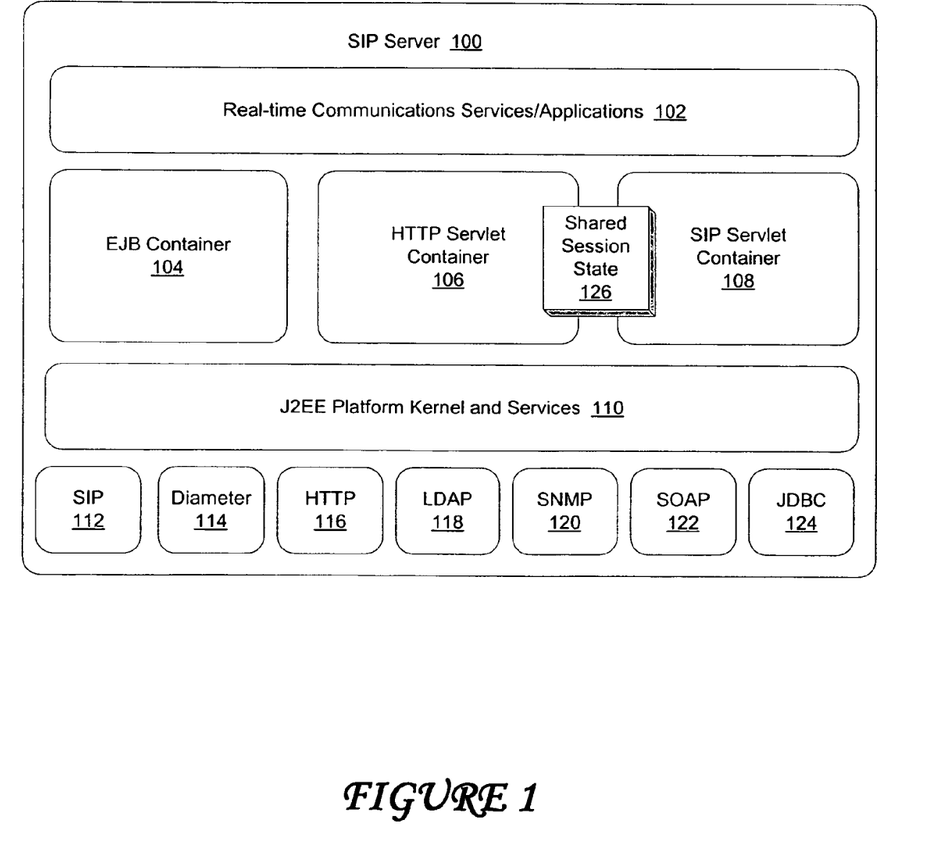
FIG. 1 is an exemplary illustration of various components of the SIP Server, in accordance with various embodiments.

FIG. 1 is an exemplary illustration of various components of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP Server 100 is a carrier-class Java Enterprise Edition (J2EE) application server that has been extended with support for the Session Initiation Protocol (SIP) and other operational enhancements that allow it to meet the demanding requirements of next-generation internet protocol (IP) based communications networks. The SIP Server can be used to create, deploy and manage various real-time communications services and applications 102 by telecom operators who wish to provide mobile and fixed multimedia services. As with any Java application server, the SIP server can take advantage of the J2EE Platform Kernel and Services 110 in order to compile, execute and optimize the performance of various programs and applications. In one embodiment, the SIP server 100 is also extended with support for a multitude of standards and protocols such as SIP 112, Diameter 114, Hyper Text Transfer Protocol (HTTP) 116, Lightweight Directory Access Protocol (LDAP) 118, Simple Network Management Protocol (SNMP) 120, Simple Object Access Protocol (SOAP) 122, Java Database Connectivity (JDBC) 124, and others.

As stated previously, the SIP Server 100 is enabled to support session initiation protocol (SIP). SIP is a protocol used primarily for creating and terminating sessions with one or more participants, such as setting up or tearing down voice or video calls. SIP is described in more detail in RFC 3261 of the IETF SIP Working Group, which is incorporated herein by reference.

The SIP protocol specification defines different types of high level SIP roles, namely user agents (UA) which include UA clients, UA servers, and Back-to-Back user agents (B2BUA). The SIP protocol also defines the roles of Proxies, Registrars and Redirect Servers. Accordingly, the SIP Servlet API of the SIP server 100 allows any of these roles to be coded as a SIP Servlet Application. Furthermore, because SIP is an extensible protocol, the API is also designed to allow developers to easily extend functionality. This can be accomplished by dividing up the SIP processing between the container functions and the applications. Most of the base protocol can be performed by the container, leaving the higher level tasks for the applications to perform. This division of processing can lead to a great amount of flexibility to the SIP Servlet API.

As further illustrated in FIG. 1, the SIP Server 100 can include an Enterprise Java Bean (EJB) container 104, an HTTP Servlet container 106 and a SIP Servlet container 108. Each of these containers can provide an environment that supports the execution of applications developed using its corresponding technology. For example, the EJB container 104 manages enterprise beans contained within it, which in turn provide the business logic for a J2EE application. This management can encompass services such as registering, creating and destroying objects and their instances, providing remote interfaces to objects, managing the state of objects, maintaining security, and coordinating distributed transactions. Similarly, the HTTP container 106 and the SIP Servlet container 108 can be responsible for managing HTTP and SIP servlets respectively.

The SIP stack of the SIP Server 100 can be fully integrated into the SIP Servlet container 108 and is more powerful and easier to use than a traditional protocol stack. For example the higher level abstraction of the SIP Servlet API can free the developer from the mechanics of handling of transaction timers, syntactic evaluation of received requests, generation of non application-related responses, generation of fully formed SIP requests from request objects (which may involve correct preparation of system headers and generation of syntactically correct SIP messages) and handling of lower-layer transport protocols such as Transport Control Protocol (TCP), User Datagram Protocol (UDP) and Stream Control Transmission Protocol (SCTP).

In one embodiment, the Servlet container can provide a Shared Session Context 126 and session application programming interface (API) in order to maintain awareness of the state of the larger converged SIP and HTTP application session. There are many use cases where a converged application, using both SIP and HTTP functions, is desirable. Some examples of these applications include conferencing and click-to-call applications, as well as Presence and User Agent Configuration Management applications. The converged applications can also use other protocols (e.g. Diameter) to perform more advanced functions such as modifying subscriber profile data. Furthermore, the container can provider a whole host of other services including distributing request and response objects to components in a structured way as well as managing the end-to-end object lifecycle, including resource, transaction and session state management.

Figure 2:
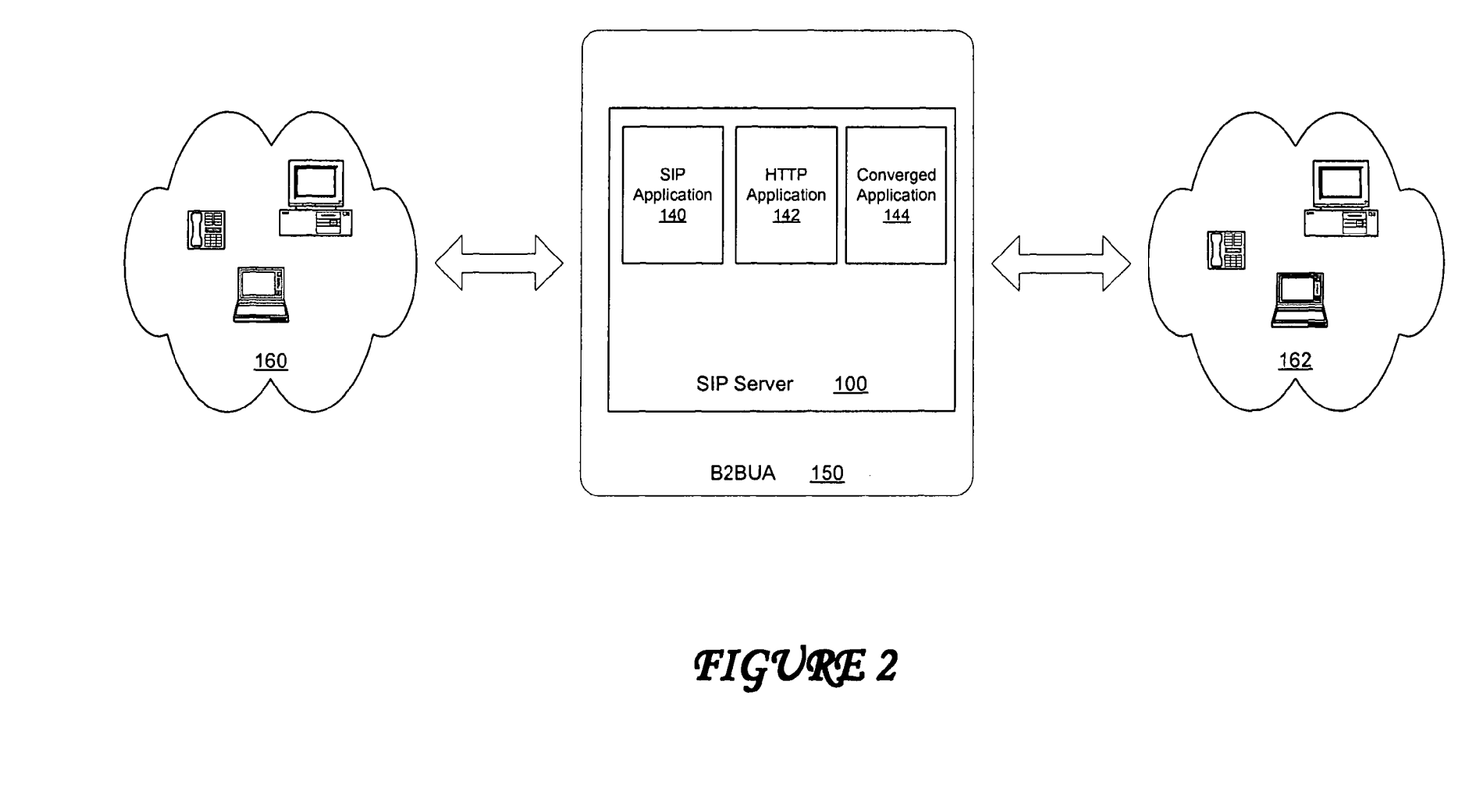
FIG. 2 is an illustration of an exemplary use of the SIP Server, in accordance with various embodiments.

FIG. 2 is an illustration of an exemplary use of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP server 100, along with the various applications hosted thereon (e.g. 140, 142 and 144), can be used as a back-to-back user agent (B2BUA) 150 in a typical telecommunications environment. A B2BUA can take the place of an intermediary between communications by user agents 160, 162, which may include various cellular phones, wireless devices, laptops, computers, applications, and other components capable of communicating with one another electronically. The B2BUA 150 can provide multiple advantages, such as controlling the flow of communication between user agents, enabling different types of user agents to communicate with one another (e.g. a web application can communicate with a cellular phone), as well as various security advantages. As one illustration, the user agents can transmit to the SIP server instead of communicating directly to each other and thus malicious users can be prevented from sending spam and viruses, hacking into other user agent devices, and otherwise compromising security. It should be noted that the SIP Server 100 need not necessarily take the role of a B2BUA as illustrated in FIG. 2, but can also be used as a proxy, a redirect server, or some other role defined by the SIP protocol.

Figure 3:
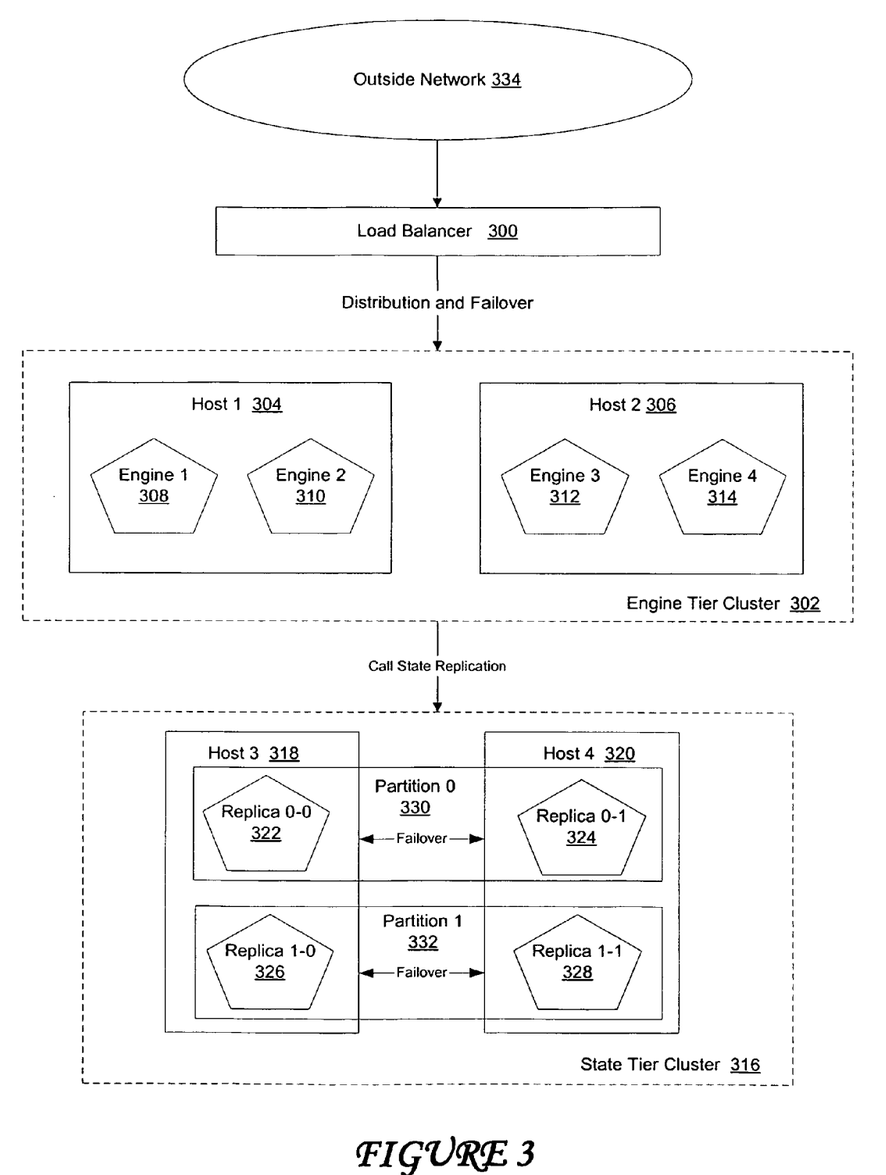
FIG. 3 is an exemplary illustration of a tiered architecture of the SIP server deployment, in accordance with various embodiments.

FIG. 3 is an exemplary illustration of a tiered architecture of the SIP server deployment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, various messages, such as phone call requests or other transfers of data associated with the SIP protocol, can come into the cluster from the internet (such as over VOIP), phone, or some other type of outside network 334. This message can be received and handled by a load balancer 300 which can be responsible distributing message traffic across the engines (i.e. engine 1 308, engine 2 310, engine 3 312 and engine 4 314) in the cluster which handle the processing of the message traffic. The load balancer can be a standard load balancing appliance hardware device and it is not necessary that it be SIP aware; there is no requirement that the load balancer support affinity between the engines and SIP dialogs or transactions. Alternatively, the load balancer can be implemented as software that distributes the messages to the various engines. In the various embodiments, the primary goal of the load balancer 300 can be to provide a single public address that distributes incoming SIP requests to available servers in the SIP server engine tier cluster 302. Such distribution of requests can ensure that the SIP server engines are fully utilized. The load balancer 300 can also be used for performing maintenance activities such as upgrading individual servers or applications without disrupting existing SIP clients.

In the embodiment illustrated, the SIP server can provide a two-tier cluster architecture model to handle the incoming messages. In this model, a stateless engine tier cluster 302 can process all signaling traffic and can also replicate transaction and session state to the state tier cluster 316 which in turn can be divided into multiple partitions. Each partition can consist of any number of nodes (replicas) distributed across any number of hosts such as host 3 318 and host 4 320 which can be implemented as computers linked in a cluster type network environment. For example, partition 0 330 can include state replica 0-0 322 and a state replica 0-1 324 which can maintain copies of the call state information of the partition. The state tier cluster 316 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

On the other hand, the engine tier cluster 302 can be implemented as a cluster of SIP server instances that hosts the SIP servlets which provide various features to SIP clients. In one embodiment, the engine tier is stateless, meaning that the SIP session state information is not persisted in the engine tier, but is obtained by querying the state tier cluster 316 which can in turn provide replication and failover services for SIP session data.

In one embodiment, the engine nodes write state data to all the replicas of the appropriate partition so that failover can be provided between the replicas in the event that one should crash or fail. However, when retrieving state data from the partition, the engine does not require all of the replicas to transmit the data. Thus, in order to minimize the traffic and network load, each partition can designate a primary replica in charge of responding to the engine queries with the appropriate data. This primary replica can be selected in a variety of ways. For example, the first replica to boot up in a partition can be designated the primary replica and this will be designated as the replica that is in charge of returning data to the requesting engine. If multiple replicas boot up at the same time, there can be a handshaking process during which the replicas themselves determine which one of them will be designated as the primary. Other algorithms can also be used to determine the primary replica and the invention is not intended to be limited to any one particular algorithm.

The primary overall goal of the engine tier 302 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier cluster 316 can be implemented as a cluster of SIP server instances that provides a high-performance, highly-available, in-memory store for maintaining and retrieving session state data for SIP servlets. This session data may be required by SIP applications in the SIP server engine tier 302 in order to process incoming messages. Within the state tier 316, session data can be managed in one or more partitions (e.g. partition 0 330 and partition 1 332), where each partition manages a fixed portion of the concurrent call state. For example, in a system that uses two partitions, the first partition 0 330 could manage one half of the concurrent call state (e.g. A-M) and the second partition 1 332 can manage the other half (e.g. N-Z). With three partitions (not shown), each can manage a third of the call state and so on. Additional partitions can be added as needed to manage large number of concurrent calls or incoming messages.

In one embodiment, within each partition, multiple state servers can be added to provide redundancy and failover should the other servers in the partition fail. When multiple servers participate in the same partition, those servers can be referred to as replicas because each server maintains a duplicate copy of the partition's call state. For example, partition 0 330 can maintain its state information in replica 0-0 322 and replica 0-1 324. In some embodiments, the replicas can be distributed over multiple hosts (e.g. host 3 318 and host 4 320) in order to provide host-to-host failover services in cases where a computer crashes. Furthermore, to increase the capacity of the state tier 316, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas can join and leave the associated partition and each replica can serve as exactly one partition at a time. Thus, in one embodiment, the total available call state storage capacity of the cluster is a summation of the capacities of each partition.

In one embodiment, each partition can peer-replicated, meaning that clients perform all operations (reads/writes) to all replicas in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better host-to-host failover characteristics as well, since there does not need to be change propagation delay.

In one embodiment, the engine nodes 308, 310, 312 and 314 which are distributed over multiple hosts 304, 306, can be responsible for executing the call processing. Each call can have a call state associated with it. This call state can contain various information associated with the call, such as the ids of the caller/callee, where the caller is, what application is running on the callee, any timer objects that may need to fire in order to process the call flow as well as any other data that may be need to enable a SIP session between two entities. The state for each call can be contained in the state tier 316. The engine tier 302, on the other hand, could be stateless in order to achieve the maximum performance. In alternative embodiments, the engine tier can have small amounts of state data stored thereon at selected periods of time.

In one embodiment, a typical message processing flow can involve locking/getting the call state, processing the message and putting/unlocking the call state. The operations supported by the replicas for normal operations can include:

lock and get call state—where the engines request session state data from the state replicas in the partition and the primary replica locks that session state data for processing across all the other replicas in the same partition.

put and unlock call state—where the engines update the session state data to the state tier and the data is unlocked for access by other engines.

lock and get call states with expired timers—where session state data that has expired can be retrieved from the state tier.

Efficient Storage of Long-Lived Session State

The SIP server can also provide a way to efficiently persist long-lived state data to a disk in order to avoid unnecessary consumption of cluster resources. The state tier can persist call state data to a relational database management system (RDBMS) after a call dialog (session) has been established and can also retrieve or delete the persisted data as needed to modify or remove the call state. The SIP server can also provide an API for application developers to provide hints as to when the state tier should persist the data, as will be further discussed below.

As an illustration, in the above described embodiments the state tier maintains call state in various data objects residing in the random access memory (RAM) of a computer. This can provide significant low-latency advantages to the engine tier. However, the SIP server can also provide a way for efficiently persisting long-lived state information to a database (disk storage). Since RAM is generally significantly more expensive than database memory, it may be desirable to reduce the number of replicas in the state tier by storing at least some of the session state information to the database. In most cases, database access to data is slower than RAM-based replica access. However, because some SIP communication sessions are not as latency-sensitive as others, the state for these communications can be persisted in the database in order to save the amount of random access memory required by the SIP server deployment. For example, a telephone call setup stage can be extremely latency-sensitive, while a subscription by a cable box to receive infrequent updates or notifications can tolerate much slower access times. Thus, the state data associated with such an ongoing subscription session can be stored in a database so as to save the amount of RAM needed for the deployment. As another illustration, a standard telephone call can be viewed as having three stages—a call setup stage, an active call stage and the call teardown stage (hanging up the call). The call setup stage is typically the most latency-sensitive since users tend to expect immediate results from the server after pressing the call button. However, the call teardown stage may not be as sensitive to latency because after the handset disconnects, it may not matter from the user's perspective how long it will take for the server to complete call termination. As such, session state for call termination can be maintained in a database. Similarly, the active call stage may also be not as latency-sensitive as the call setup stage since it mostly involves communication of voice bits between media servers. It should be noted that these examples are provided purely for purposes of illustration and are not intended to limit the invention in any way. Any state can be saved to a database if it can reasonably tolerate the access times required by database create, read, update or delete (CRUD) operations.

In various embodiments, appropriate filtering and caching strategies may be employed in order to reduce the impact on transaction state and access times for session and transaction state that is likely to be needed in latency-sensitive operations, while allowing for the storage of large amounts of active sessions and timers on local disks as a means of reducing costs. The SIP server can use the RDBMS to supplement the state tier. To improve the latency of message processing when using the database, timers and locking information can be maintained in memory on the state tier. Similarly, the state tier can also maintain the call states being actively modified. In one embodiment, the state is persisted only after a dialog has been established and the call is in progress, or alternatively in response to hints provided by the application.

Figure 4:
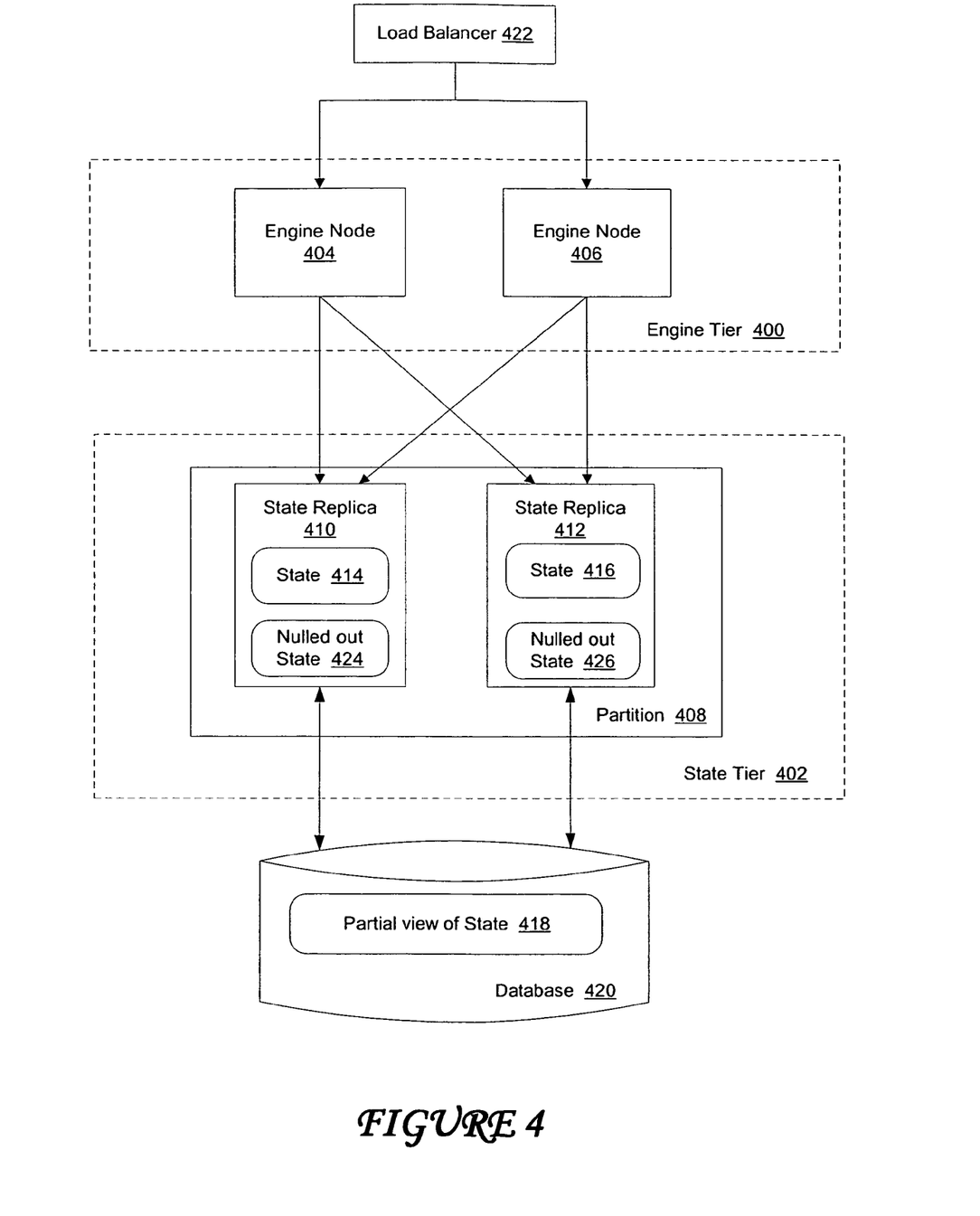
FIG. 4 is an exemplary illustration of a SIP server deployment implementing the efficient storage of long-lived session state, in accordance with various embodiments.

FIG. 4 is an exemplary illustration of a SIP server deployment implementing the efficient storage of long-lived session state, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As previously discussed, a load balancer 422 can distribute various incoming messages to the engine nodes 404 and 406 of the engine tier 400 in a round-robin fashion. The engine nodes can be responsible for efficiently processing the various messages and transactions by obtaining any needed state data from the state tier 402. The state replicas 410 and 412 of partition 408 can maintain the state data 414 and 416 associated with the various SIP sessions and provide it to the engine nodes upon request.

As illustrated, at least some of the session state 418 can also be stored in a persistent store or database 420 such as an Oracle® database. In one embodiment, this persistent store is not intended to provide additional redundancy, but is instead configured for reducing memory requirements in the state replicas 410 and 412. This can enable un-reliable writes to the database such that a failure to write does not compromise the correctness of the state tier 402 even if it may cause the persistent store to be incorrect.

In one embodiment, the database only stores a partial view 418 of the state maintained in the state tier. For example, various timer objects as well as locking information can still be maintained on the state tier while other data that is not as latency-sensitive may be pushed to the database for later retrieval. This is done because the high throughput processing of the engine tier may not be met when saving all state changes and timer functionality upon every transaction to the database. Thus, in order to improve latency, the timer objects and lock data associated with a call session can be maintained in RAM-based state replicas even while various other data associated with the call session is written to the database.

The persisting of session state in the database can be driven by hints provided by the engine tier. For example, the engine node 404, upon reaching a transaction boundary, can provide a hint to the state replicas indicating that it is time for the state data to be replicated to the database. A transaction boundary can indicate to the state tier that no further transactions are likely to occur in the near future, which would change the call state associated with the session. State replicas can follow the hint or alternatively they can choose to disregard it. In one embodiment, a PutAndUnlock method such as "AsyncResult putAndUnlock(PartitionView clientView, long clientID, Key key, int lockID, byte [ ] data, int version, long time, int flags) throws ReplicaException, RemoteException;" has an added integer flag "flags" which encodes a Boolean hint that the state should be persisted. Thus, during the updating of the state and unlocking it in the partition, the engine can provide a hint to save the data to the database.

The engines can determine when to hint to the state replicas in a multitude of ways. In one embodiment, the engine can determine, based on its processing of various transactions, that the session state has reached a steady state—i.e. that it is not expected that this particular call state will change within a specified period of time. For example, once an ongoing subscription session has been established by a cable box, that session state is unlikely to change until the configuration for that cable box needs to change, i.e. for a significantly long period of time (e.g. 24 hrs). Thus, after this session has been established, the engine can provide a hint to the replica to save session state data to the database. As another example, after a telephone call has been established during the latency-sensitive setup stage, the session state is unlikely to change since most of the communication is being sent over the media servers. This point in time can also indicate a steady session state and may be a good candidate for placing a hint. In one embodiment, the engine decision to save is controlled by the transaction manager. The following is an illustrative and non-limiting list of SIP protocol actions upon which the engine can choose to transmit a hint to the state tier:

a. On a state transition TXN_COMPLETED, the engine can place a hint to save unless the request is an INVITE made during the SIP call setup stage;
  b. For an INVITE and acting as the user agent server (UAS) on receipt of an ACK (acknowledge signal) or if the ACK waiting time is exceeded (timer);
  c. For an INVITE and acting as the user agent client (UAC) or proxy after sending an ACK.

In various embodiments, the engine can itself receive hints from the application or servlet deployed thereon, and can merely relay that hint to the state replica. In some cases, the application developer may be able to make the best estimation as to when the transactions will have reached a steady state and thus, the engines can take advantage of this by reading hints from the application.

In various embodiments, the state replicas can choose to follow it and copy the data to the persistent store or, alternatively choose to disregard the hint. For example, a state replica may receive a hint to persist the data from one engine, but immediately following that hint and before it has had a chance to save the data to the database, the replica may receive a new request from another engine for the same session state. In that case, the state replica may choose to disregard the hint to save data and wait to receive the hint from that other engine. Similarly, several servlets or applications may end up on the same session and while one may produce a hint to copy the state, the state replica may choose to disregard that hint and wait to receive an aggregate view of a steady state across all of the applications on that session.

Furthermore, the state replicas may be programmed with logic to optimize the following or disregarding of hints according to their own memory usage. For example, a state replica may choose to ignore all hints to copy state to the database if only a small fraction of its RAM based memory is being currently used, in order to provide faster overall services. Conversely, if a large portion of the memory has already been taken up, the state replicas may choose to follow most hints so as to take full advantage of memory reduction.

Once a decision has been made to persist the call state, a single replica in the partition can be designated as the persister and this replica is configured to process the call state writes or deletes to the database. This persister replica can be designated in several ways. In one embodiment, the primary replica responsible for answering queries from the engine tier (as previously discussed), is also responsible for placing writes and deletes to the persistent store. In alternative embodiments, other replicas can be selected so as to remove the burden from the primary replica.

The persister replica in a partition is responsible for writing data. To avoid impacting latency, the thread handling the putAndUnlock command can imply enqueue a task to perform the database insert/update. A separate thread will then actually run that task. Thus, an execute queue can be maintained by the replicas in order to provide asynchronous put and remove operations to the database. In this manner, the caller is not blocked waiting for a thread to finish executing and can continue performing other actions as needed.

Subsequent to being persisted in the RDBMS, the session state data can be safely removed from the state tier partition 408. The removal of the data in the state replica can include nulling out the byte array containing the actual call state data in the RAM data structure, while preserving the primary key associated with that particular state. In one embodiment, the entire call state storage need not be deleted since lock processing and timer processing is not stored to the persistent store. Thus, in some embodiments, a call state with null data 424 and 426 is different from missing call state, which would lead to the creation of a new call state. However, this is not intended to limit the invention and in alternative embodiments other methodology can be implemented to remove session state from the replicas upon saving it to the database in order to conserve RAM-based storage space.

Given such asynchronous nature of the save operations, a version identifier for the call state may be desirable so as to handle race conditions. The extant cacheVersion can be adjusted to be a call state versioning ID, starting at 1 and incremented at each lock operation. In one embodiment, this state version information can allow or disallow the nulling out of state data in the replica based on whether the version in the database is fresh.

After removing the state by the persister replica, a notification can be sent to the other replicas in the partition. In one embodiment, a method such as notifyPersisted (Key key, int version) can be used to notify the other replicas that the call state has been saved to the persistent store and therefore can be safely removed from the RAM store. Upon receiving this notifications, the other replicas in the partition can appropriately null out the state data while preserving the various timer and lock information, as previously discussed.

Any available replica can be used to retrieve the call states from the persistent store as necessary for subsequent reads. For example, during a lock and get request, the primary replica can read the session state data from the database and return it to the engine if the state stored in the RAM of the replica is nulled out. In this manner, significant storage costs can be reduced for the state tier layer, while still allowing minimized latency for those SIP sessions and applications that require it.

Figure 5:
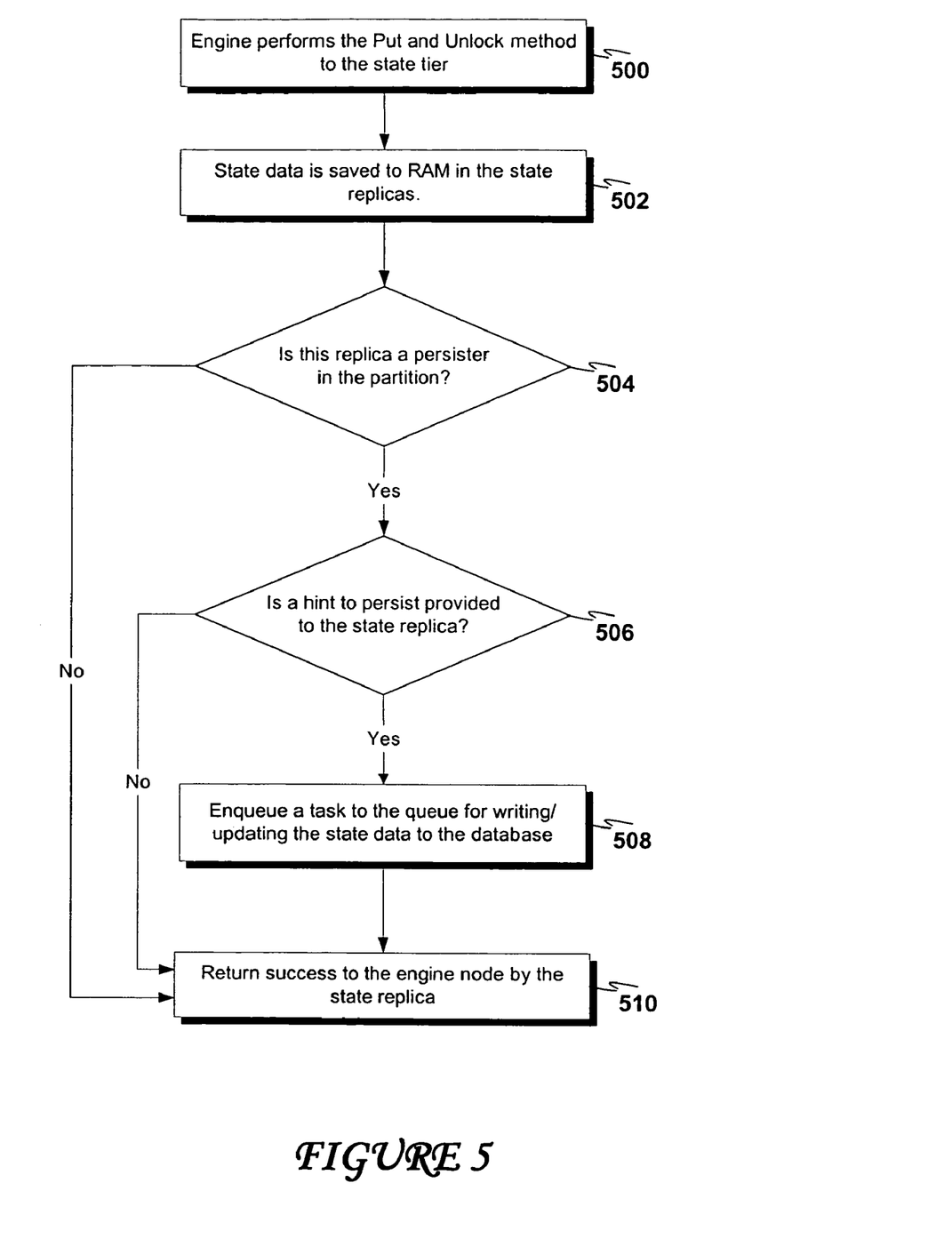
FIG. 5 is an exemplary flow diagram of persisting the data to a relational database system, in accordance with various embodiments.

FIG. 5 is an exemplary flow diagram of persisting the data to a relational database system, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 500, after an engine has finished processing a transaction, it can place a putAndUnlock call to the state tier replica. At this point the state is saved to the random access memory, as shown in step 502, and the lock is released such that the state is capable of being accessed by other engines.

In step 504, it is determined whether this particular replica is a persister in the partition. If it is not, then no further action is required from this replica and it can safely return a signal indicating success of the putAndUnlock method to the engine tier, as illustrated in step 510. If, on the other hand, this replica has been designated a persister, then processing continues to step 506, where it is determined whether a hint to persist the state was provided to the replica. This determination can be made by reading an integer flag variable of the putAndUnlock method, for example. If a hint was provided, the state replica can add a task to the Execute Queue for writing or updating the state data to the RDBMS, as shown in step 508. After the task has been added, or alternatively, if no hint was provided, the replica can return a success indication to the engine node that placed the putAndUnlock call, as shown in step 510.

Figure 6:
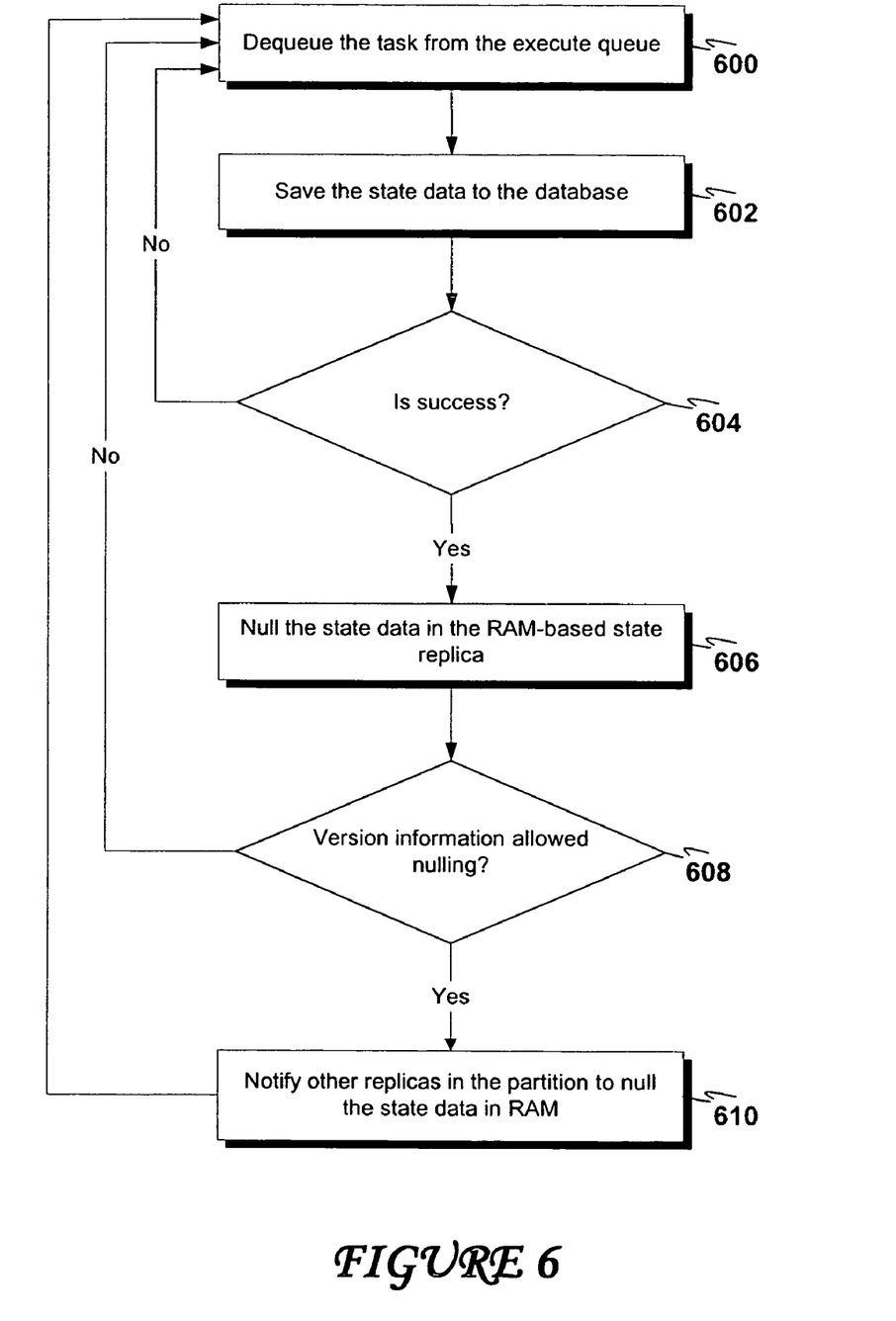
FIG. 6 is an exemplary high level flow diagram of the thread used to read the queue and perform the actual writes or updates to the database, in accordance with various embodiments.

FIG. 6 is an exemplary flow diagram of the thread used to read the queue and perform the actual writes or updates to the database, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

In step 600, a thread (executing separately from the thread that has enqueued the task), dequeues a task from the execute queue. In step 602, the CRUD operation such as an update is written to the database. If that operation is a success, as determined in step 604, the process can continue to step 606. If on the other hand, the update operation does not return an indication of success, the thread can proceed to dequeue another task (or the same task) from the execute queue. Since in some embodiments, unreliable writes to the database are permitted, no further processing need be required of the thread at this point. However, it should be noted that various error checking and reliable writes are also possible and are within the scope of the present invention.

In step 606, the state data in the RAM of the replica is attempted to be nulled. In other words, the byte array containing the actual data stored is set to value null, while maintaining the primary key, lock and timer information within the replica. If this operation is allowed by the versioning ID, as determined in step 608, then a notify method can be called. AS shown in step 610, this notify method can inform other replicas in the partition that the state data has been successfully saved to the database and that it is safe to null out the copies of that state information in the other replicas as well. After this, the thread can loop back to step 600 and proceed with dequeueing the next task from the execute queue.

Figure 7:
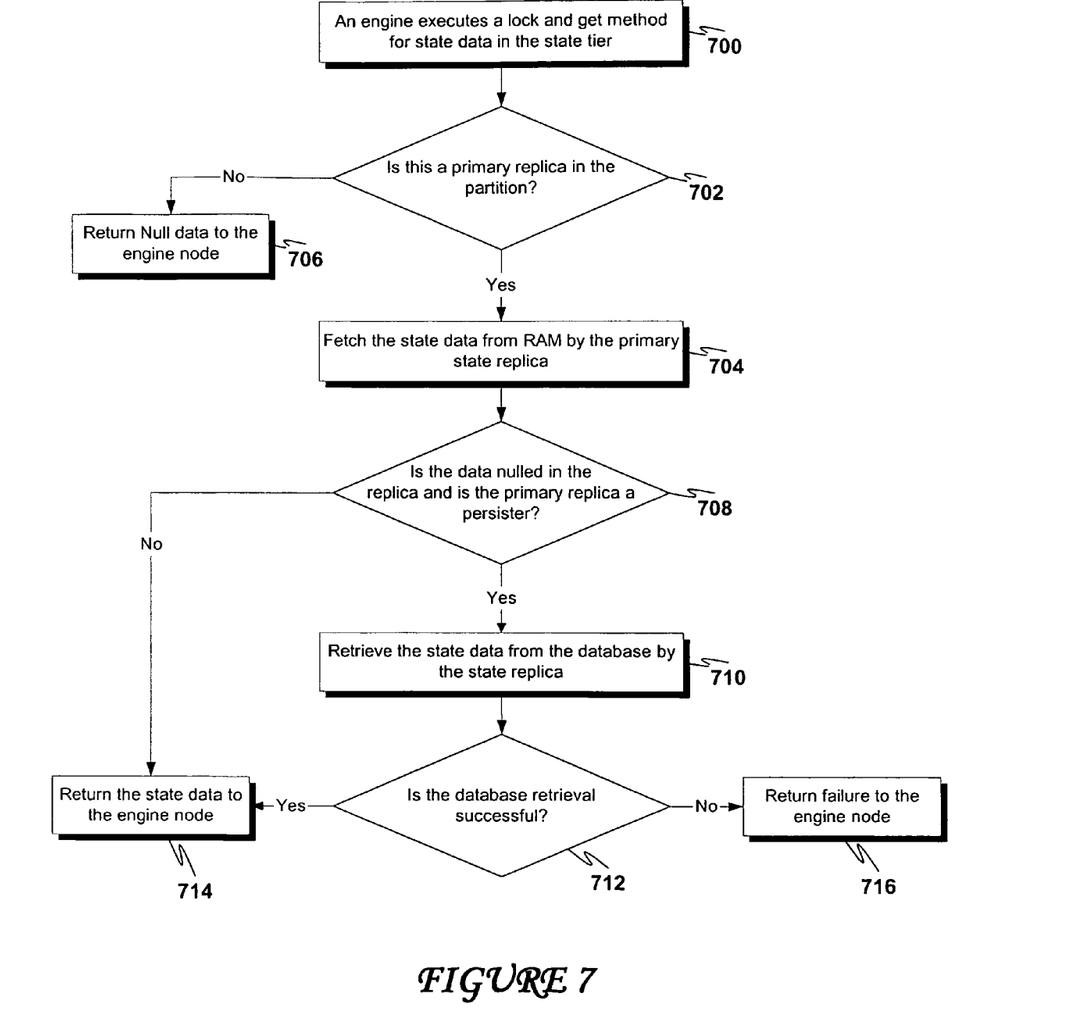
FIG. 7 is an exemplary flow diagram of retrieving the session state data from a database during a lock and get method, in accordance with various embodiments.

FIG. 7 is an exemplary flow diagram of retrieving the session state data from a database during a lock and get method, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

In step 700, an engine node may execute a lock and get method during the processing of a transaction. During this method a query is performed against the state tier, requesting the state data associated with the transaction or call being processed. In step 702, the state tier determines whether the replica receiving the query is a primary replica (replica designated to provide state to the engines). If the replica is not a primary replica, it can merely return null value to the engine, as illustrated in step 706, avoiding any redundant processing. If on the other hand, the replica is a primary replica, processing continues to step 704.

In step 704, the state data is fetched from the RAM by the primary replica. In step 708, a determination is made whether the state data has been nulled, and whether this state replica is designated a persister. If both of these conditions evaluate to true, the state replica can be configured to retrieve the state data from the database, as illustrated in step 710. If, on the other hand, either condition evaluates to false, the state data can be returned to the engine node, as shown in step 714.

If the database retrieval is successful, as determined in step 712, the state replica may return the data to the engine that has executed the lock and get request. On the other hand, if the database retrieval failed for some reason (e.g. due to a database error), the state replica can instead return a failure to the engine node, as shown in step 716, indicating an error in retrieving the state.

Figure 8:
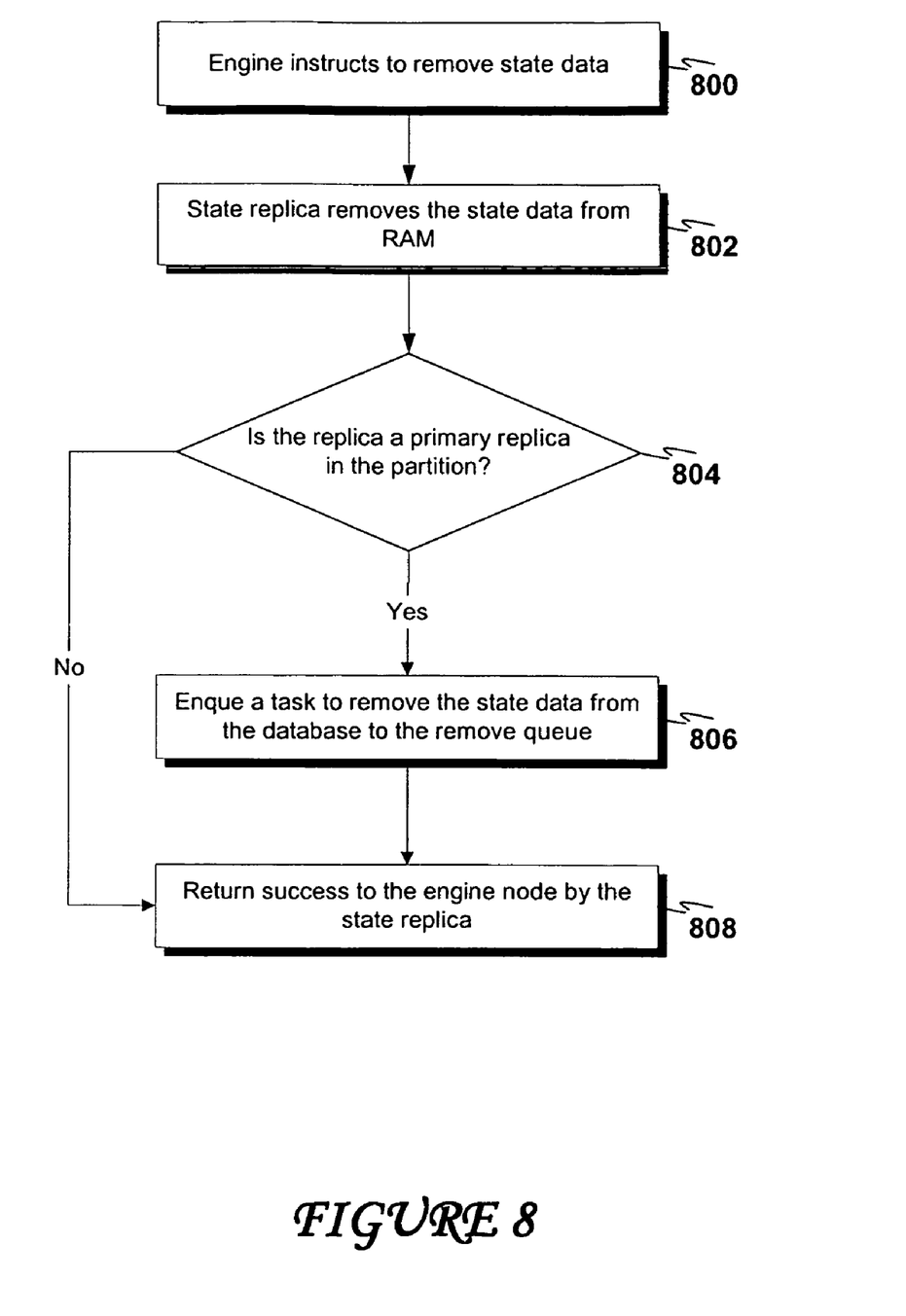
FIG. 8 is an exemplary flow diagram of removing session state data from the database, in accordance with various embodiments.

FIG. 8 is an exemplary flow diagram of removing session state data from the database, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

In step 800, an engine node can instruct the state replica to remove the state from the database. The state replica can remove the session state from its RAM, as shown in step 802. If the replica is a primary replica, as determined in step 804, a task can be enqueued to the remove queue, as shown in step 806. Note that a different replica than the primary can also be used within the scope of the present embodiments. After the task is added to this queue, success can be returned to the engine node, as shown in step 808, whereupon the thread is freed up to perform other tasks. A separate thread can then dequeue the task from the remove queue and perform the appropriate CRUD operation to delete the data therefrom. It should also be noted that in alternative embodiments, some call states can be silently expired, i.e. removed without the intervention of the engine tier. In these cases, the persister replica is adapted to also remove the call state from the persistent store.

In various embodiments, a new domain template replicatedDatabase is created in order to support the creation of new domains with database-backed replication. This new template can add to the replicated domain a JDBC connection pool having one connection targeting the state tier cluster, a JDBC data source containing the pool and targeting the state tier, as well as an execute queue having one thread that will perform the tasks of writing data to the database. Furthermore, an SQL file can be applied to create the data schema needed for the database. The model can be based on a numeric primary key generated by using the hashcode of the call identifier (call ID). Because the call ID is a string controlled by the UACs and is of unknown length to the SIP server, the numeric key that is used to store the data can be generated by hashing the call ID. This can allow the SIP server to store the session state data in a more consistent manner.

In one embodiment, individual database operations are placed on an execute queue which get consumed by a single thread, thus preserving the order of operations. On each successful database insert or put, an additional remote method invocation (RMI) call is undertaken by each replica in the view. However, this is not intended to limit the invention and in alternative embodiments, multiple threads can be used to execute the write tasks. In those cases, care should be taken that the same thread handles operations for a given key. Furthermore, in yet other embodiments, instead of placing database operations on an execute queue, they could be placed in a map, indexed by a key and consumed by a timer based thread. This timer task approach may add increased complexity and possibly increase the number of operations lost in case of replica failure. However, it could have the following performance benefits:

a. If multiple operations on a single key occur in a timer window, only the latest will fire, thus saving on unnecessary intermediate operations; and b. Operations could be batched, saving both in the number of database operations and on the number of RMI calls to the other replicas.

Other possible modifications to the SIP server state persistence include for example, distributing database operations across all replicas in the partition, instead of having only the persister replica perform such functions. Furthermore, a different table for each partition could be used, thereby decreasing the contention on the database. All of these modifications may be left to be determined by an administrator and may be specific to each SIP server deployment and its particular requirements.

Various embodiments of the invention can include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments and containers, as well as user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for efficient storage of session state data, said system comprising:
a cluster network of computer server devices, said network including
a first server device having an engine node dedicated to processing a set of transactions and
a second server device having a state replica that stores said session state data associated with said transactions in random access memory (RAM), wherein the state replica provides the session state data to the engine node, and wherein the engine node processes said transactions using the session state data; and
a database connected to said cluster network, wherein said database stores a portion of said session state data; and
wherein the engine node on the first server device transmits a hint message to the state replica on the second server device, wherein the hint message contains information instructing the state replica node to persist the portion of the session state data to the database; and
wherein said state replica receives a hint message from the engine node and determines whether to disregard or to follow said hint message, wherein if the state replica determines to follow said hint message, the state replica persists the portion of the session state data to the database as instructed by the information in the hint message, otherwise if the state replica determines to disregard said hint message, the session state data is not persisted to the database and remains on the state replica.

2. The system according to claim 1 wherein said state replica removes said portion of state data from the RAM thereon after replicating said portion of the session state data to the database.

3. The system according to claim 2 wherein said state replica removes said portion of state data from the RAM by nulling out the byte array holding the session state data, while preserving, in said RAM, at least one of:
a primary key associated with said session state data;
a set of timer objects associated with said session state data; and
locking information associated with said session state data.

4. The system according to claim 2 wherein said state replica notifies all other state replicas in a same partition as said state replica to remove said portion of the session state data after it has been replicated to said database.

5. The system according to claim 1 wherein the engine node receives a hint from an application deployed thereon, said hint indicating that the application has determined that the portion of said session state will not be altered within a specified period of time; and
relaying said hint to the state node by the engine node.

6. The system according to claim 1 wherein the state replica determines whether to follow or disregard said hint message based on at least one of: a subsequent request for said session state data received from said engine node, an amount of available memory on said state replica, and an aggregate view of steady state across all applications in a session associated with said session state data.

7. The system according to claim 1 wherein each server in said cluster network is a session initiation protocol (SIP) server and wherein the engine node determines that at least one of the following has occurred:
a subscription session has been established by a SIP cable box client with said SIP server; and
a telephone call has been setup by a SIP telephone client with said SIP server.

8. The system according to claim 1 wherein persisting said portion of the session state data to the database by the state node further includes:
enqueueing, by a first thread, a task to update the database to an execute queue maintained in said state node;
releasing said first thread; and
initiating a second thread to dequeue said task from the execute queue and to perform the update operation on the database.

9. The system according to claim 1 wherein said state replica receives a new request for said session state data from said engine node and retrieves said session state data from the database if the session state data has been removed from the RAM of said state replica.

10. A computer implemented method for efficiently storing session state data, said method comprising:
maintaining a computer network of server devices, said network including
a first server device having an engine node dedicated to processing a set of transactions and
a second server device having an state replica node that stores the session state data associated with said transactions in random access memory (RAM), wherein the state replica provides the session state data to the engine node, and wherein the engine node processes said transactions using the session state data;
receiving an update to said session state from an engine node to a state replica node;
storing said update to the session state data in the state replica node,
transmitting a hint message from the engine node on the first server device to the state replica on the second server device, wherein the hint message contains information instructing the state replica node to persist the portion of the session state data to the database;
receiving the hint message from the engine node to the state replica node;
determining, by the state replica node that received said hint message, whether to disregard or to follow said hint message;
persisting, by the state replica node, the portion of the session state data into the database as instructed by the information in the hint message if the state replica node determines to follow said hint message; and
removing the portion of said session state data from the state replica node after the portion of said session state data has been persisted to the database.

11. The method according to claim 10 wherein removing the portion of said session state data from the state replica node further includes:
nulling out the byte representation of said session state data on the state replica node while preserving, on said state replica node, at least one of: a primary key associated with said session state data, timer objects associated with said session state data, and locking information associated with said session state data.

12. The method according to claim 10 further comprising:

notifying, by said state replica node, all other state replica nodes in a same partition as said state replica to remove said session state data after it has been replicated to said database.

13. The method according to claim 10 wherein receiving the hint message from the engine node to the state replica node further includes:

receiving a hint by the engine node from an application deployed on said engine node, said hint indicating that the application has determined that the portion of said session state will not be altered within a specified period of time; and relaying said hint to the state node by the engine node.

14. The method according to claim 10 wherein the state replica node determines whether to follow or disregard said hint message based on at least one of: a subsequent request for said session state data received from said engine node, an amount of available memory on said state node, and an aggregate view of steady state across all applications in a session associated with said session state data.

15. The method according to claim 10 wherein each server in said computer network is a session initiation protocol (SIP) server and wherein the engine node determines that at least one of the following has occurred:

a subscription session has been established by a SIP cable box client with said SIP server; and a telephone call has been setup by a SIP telephone client with said SIP server.

16. The method according to claim 10 wherein persisting said session state data to the database by the state node further includes:

enqueueing, by a first thread, a task to update the database to an execute queue maintained in said state replica node;

releasing said first thread; and initiating a second thread to dequeue said task from the execute queue and to perform the update operation on the database.

17. A non-transitory computer-readable medium storing a set of instructions executed by one or more processors to cause the one or more processors to:

maintain a computer network of server devices, said network including a first server device having an engine node dedicated to processing a set of transactions and a second server device having an state replica node that stores the session state data associated with said transactions in random access memory (RAM), wherein the state replica provides the session state data to the engine node, and wherein the engine node processes said transactions using the session state data;

receive an update to said session state from an engine node to a state replica node;

store said update to the session state data in the state replica node, transmit a hint message from the engine node on the first server device to the state replica on the second server device, wherein the hint message contains information instructing the state replica node to persist the portion of the session state data to the database;

receive the hint message from the engine node to the state replica node;

determine, by the state replica node that received said hint message, whether to disregard or to follow said hint message;

persist, by the state replica node, the portion of the session state data into the database as instructed by the information in the hint message if the state replica node determines to follow said hint message; and remove the portion of said session state data from the state replica node after the portion of said session state data has been persisted to the database.

* * * * *

UNITED STATES PATENT AND TRADEMARK OFFICE
CERTIFICATE OF CORRECTION

| | | |
|---|---|---|
| PATENT NO. | : 8,078,737 B2 | Page 1 of 1 |
| APPLICATION NO. | : 11/956110 | |
| DATED | : December 13, 2011 | |
| INVENTOR(S) | : Cosmadopoulos et al. | |

It is certified that error appears in the above-identified patent and that said Letters Patent is hereby corrected as shown below:

In column 1, line 66, delete "(VOIP)" and insert -- (VoIP) --, therefor.

In column 5, line 7-8, delete "provider" and insert -- provide --, therefor.

In column 5, line 63, delete "VOIP)," and insert -- VoIP), --, therefor.

Signed and Sealed this
Thirteenth Day of March, 2012

David J. Kappos
*Director of the United States Patent and Trademark Office*